United States Patent [19]
Kuroda et al.

[11] Patent Number: 5,375,462
[45] Date of Patent: Dec. 27, 1994

[54] MISFIRE DETECTING SYSTEM FOR INTERNAL COMBUSTION ENGINE

[75] Inventors: Shigetaka Kuroda; Kazutomo Sawamura; Shukoh Terata; Masaki Kanehiro; Takuji Ishioka; Kenichi Maeda, all of Tochigi, Japan

[73] Assignee: Honda Giken Kogyo Kabushiki Kaisha, Tokyo, Japan

[21] Appl. No.: 61,712

[22] Filed: May 17, 1993

[30] Foreign Application Priority Data

May 18, 1992 [JP] Japan ................................. 4-148930

[51] Int. Cl.$^5$ ......................................... G01M 15/00
[52] U.S. Cl. .................................................. 73/117.3
[58] Field of Search ............... 73/116, 117.3; 123/419, 123/436; 324/378, 399; 364/431.07, 431.08

[56] References Cited

U.S. PATENT DOCUMENTS

| | | |
|---|---|---|
| 4,366,793 | 1/1983 | Coles .................................. 123/436 |
| 5,021,960 | 6/1991 | Manaka et al. . |
| 5,105,657 | 4/1992 | Nakaniwa ............................ 73/117.3 |
| 5,197,325 | 3/1993 | Tamura et al. ..................... 73/117.3 |
| 5,263,453 | 11/1993 | Wakahara et al. ................. 73/117.3 |

FOREIGN PATENT DOCUMENTS 2-153246  6/1990  Japan .

*Primary Examiner*—Robert Raevis
*Attorney, Agent, or Firm*—Nikaido, Marmelstein, Murray & Oram

[57] ABSTRACT

A misfire detecting system for an internal combustion engine, including an intake pipe internal pressure detecting device for detecting an internal pressure of an intake pipe of the internal combustion engine, and a misfire detection inhibiting device for inhibiting the detection of misfire when the internal pressure of the intake pipe detected by the intake pipe internal pressure detecting device is lower than an intake pipe internal pressure in a no-load condition.

4 Claims, 4 Drawing Sheets

MISFIRE DETECTING SYSTEM FOR INTERNAL COMBUSTION ENGINE

BACKGROUND OF THE INVENTION

1. Field of the Invention

The present invention relates to a misfire detecting system for an internal combustion engine.

2. Description of the Prior Art

As a method for detecting misfire of an internal combustion engine, there has been known a method in which misfire is detected on the basis of a rotational variation of a crankshaft (a variation in the detection cycle for a rotational angle of the crankshaft) in an internal combustion engine.

In some particular operating conditions, however, a variation in the rotation of the crankshaft may occur due to an occasional improper combustion despite a normal operation of the system. There has been an example in which operating conditions are set to forbid the detection of misfire on the ground that the detection of misfire cannot be done accurately (Japanise Patent Application No. 360626/91).

In the above example, as the operating conditions at which the monitor of misfire is forbidden, there are set a condition in which the engine cooling water temperature or the intake air temperature is below a predeterminded value, a fuel cut condition and a lean running condition.

For example, however, during vehicular running at a low load such as driving on a downhill at a highland, an amount of fuel to be injected which is too small to be controlled, is required and actually there sometimes occurs a case where fuel is not injected and the air fuel ratio becomes a lean side, thus causing improper combustion. Heretofore, even in such a case, the detection of misfire has been conducted, sometimes resulting in the occurrence of misdetection.

SUMMARY OF THE INVENTION

The present invention has been accomplished in view of the above-mentioned problem and it is the object of the invention to provide a misfire detecting system for an internal combustion engine capable of preventing misdetection in a low-load operating condition and surely detecting misfire caused by some trouble of the system.

According to the present invention, in order to achieve the aforementioned object, there is provided a misfire detecting system for an internal combustion engine, including an intake pipe internal pressure detecting means for detecting an internal pressure of an intake pipe of the internal combustion engine, and a misfire detection inhibiting means for inhibiting the detection of misfire when the internal pressure of the intake pipe detected by the intake pipe internal pressure detecting means is lower than an intake pipe internal pressure in a no-load condition.

Thus, since the monitor of misfire is inhibited in a low-load operating region in which there is a fear of misdetection, it is possible to prevent misdetection and detect more surely a misfire caused by some trouble of the system.

DETAILED DESCRIPTION OF THE PREFERRED EMBODIMENT

An embodiment of the present invention will be described in detail hereinuder with reference to FIGS. 1 to 4.

Figure 1:
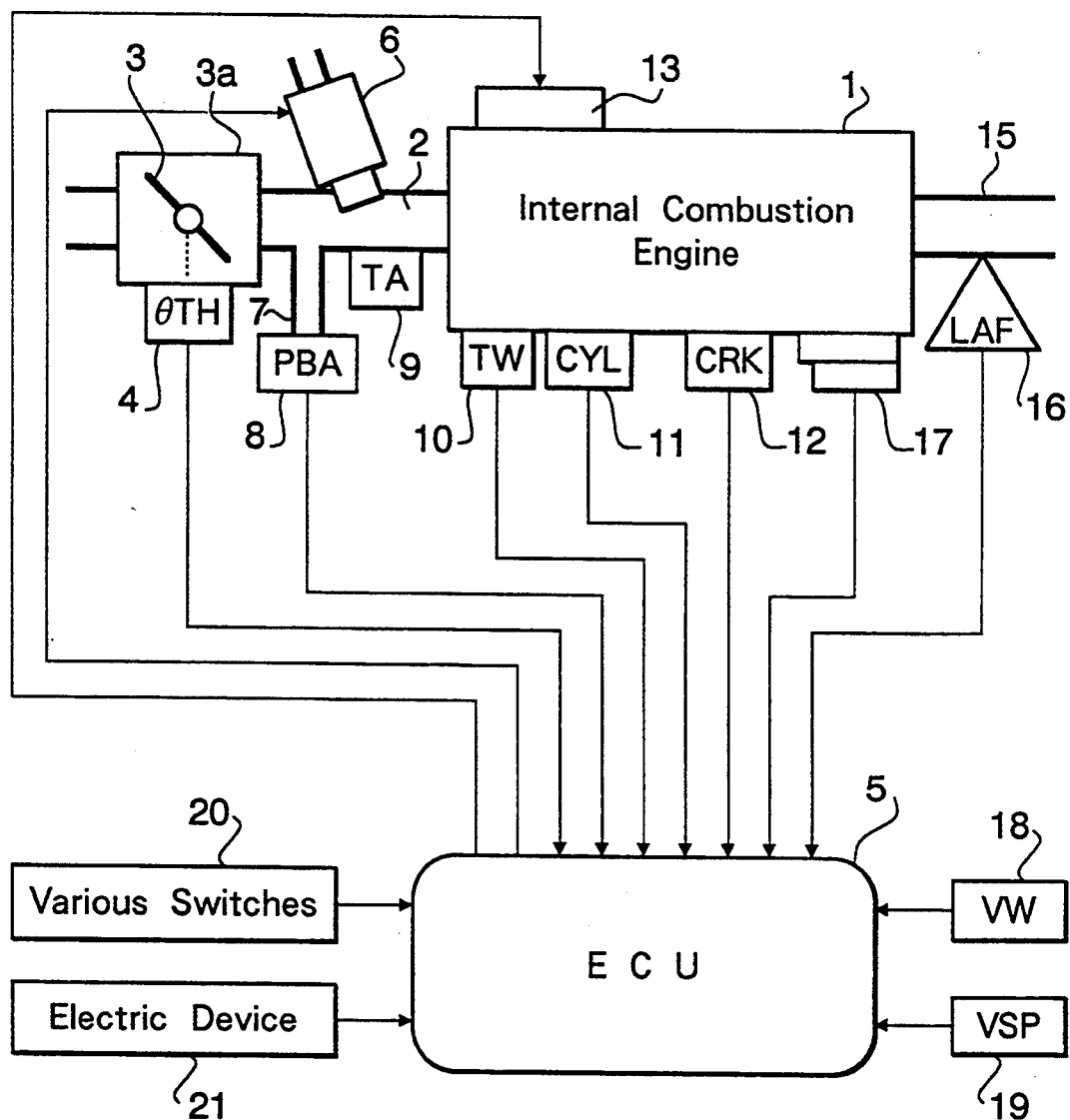
FIG. 1 is an entire construction diagram of a misfire detecting system for an internal combustion engine according to an embodiment of the present invention.

FIG. 1 is a construction diagram showing the whole of a misfire detecting system for an internal combustion engine 1 according to this embodiment.

In a suitable position of an intake pipe 2 of an internal combution engine 1 there is disposed a throttle body 3a with a throttle valve 3 mounted in the interior thereof. To the throttle valve 3 is connected a throttle valve opening ($\theta$TH) sensor 4, which outputs an electric signal proportional to the opening $\theta$TH of the throttle valve 3 to an electronic contral unit ECU 5.

For each cylinder, a fuel injection valve 6 is disposed in a suitable position of the intake pipe 2 and on a somewhat upstream side of an intake valve located between the engine 1 and the throttle valve 3. The fuel injection valve 6 is connected to a fuel pump and its opening time for fuel injection is controlled by the ECU 5.

An absolute pressure (PBA) sensor 8 is provided in a branch pipe 7 mounted on a downstream side of the intake pipe 2. A detected signal from the PBA sensor 8 is fed to ECU 5.

Further, an intake air temperature (TA) sensor 9 is installed in a pipe wall of the intake pipe 2 mounted on a downstream side of the branch pipe 7. A detected signal from the TA sensor 9 is also fed to the ECU 5.

An engine coolant temperature (TW) sensor 10 is provided on the cylinder peripheral wall filled with coolant of the cylinder block of the internal combustion engine 1, and a detected signal from the TW sensor 10 is also fed to ECU 5.

On the other hand, in the internal combustion engine 1, a cylinder control decision (CYL) sensor 11 and a crank angle (CRK) sensor 12 are mounted in predetermined positions around a cam shaft or crankshaft (not shown).

The CYL sensor 11 outputs pulse signal (CYL signal pulse) in a predetermined crank angle position of a specific cylinder at every two rotations of the crankshaft, while the CRK sensor 12 outputs a pulse signal (CRK signal pulse) at a predetermined crank angle cycle. Both CYL signal pulse and CRK signal pulse are fed to the ECU 5.

A sparking plug 13 in each cylinder of the engine 1 is controlled its ignition timing by the ECU 5.

In an exhaust pipe 15 of the engine 1 is provided a wide-range oxygen concentration sensor (LAF sensor) 16 to detect an oxygen concentration in the exhaust gas. A detected signal from the sensor 16 is fed to the ECU 5.

A transmission 17 is constituted as a known automatic transmission mechanism (AT) or manual transmission mechanism (MT), and a state detection signal therefrom is fed to the ECU 5.

A driving wheel speed (VW) sensor 18 and a driven wheel speed (VSP) sensor 19 for detecting rotating speeds of driving and driven wheels are provided, and detected signals therefrom are fed to the ECU 5.

Further, on-off signals from various switches 20, including air conditioner, brake light and power steering switches, as well as load variation signals from other electric devices 21, are fed to the ECU 5.

The ECU 5 controls operation in accordance with the aforesaid various engine parameter signals, particularly controls the fuel injection valve 6 on the basis of the oxygen concentration in the exhaust gas detected by the LAF sensor 16 and controls the operating condition of the engine, including feedback control and open loop control, to maintain the air fuel ratio in an optimum state.

A fuel injection time Tout of the fuel injection valve 6 is determined according to the following equation:

$$Tout = Ti \cdot KLAF \cdot KLS \cdot K1 + K2$$

where Ti represents a basic fuel injection time which is set on the basis of a Ti map and in accordance with an engine rotational speed NE and an intake pipe internal absolute pressure PBA.

Further, in the above equation, KLAF represents an air fuel ratio correction coefficient which, during feedback control, is set so that the air fuel ratio detected by the LAF sensor 16 coincides with a target air fuel ratio, which during open loop control, is set to a predetermined value according to an operating condition of the engine.

KLS represents a fuel thinning correction coefficient, which is set to a predetermined value according to an operating region based on a fuel thinning coefficient just before fuel-cut.

K1 and K2 represent a correction coefficient and a correction variable which are calculated in accordance with various engine parameter signals and which are set to predetermined values so as to optimize fuel economy and acceleration characteristics according to engine operating conditions for each cylinder.

The ECU 5 calculates a slip rate $\lambda$ from the driving wheel speed VW and vehicle speed VSP on the basis of the following equation:

$$\lambda = (VW - VSP)/VW$$

Further provided is a traction control system TCS for lowering the torque of each driving wheel in accordance with the slip rate $\lambda$ to suppress an excessive slipping of the driving wheels.

Under the above construction, the ECU 5 has a misfire detecting means for detecting misfire in an engine cylinder. How misfire is detected by this misfire detecting means will be described below briefly.

Figure 2:
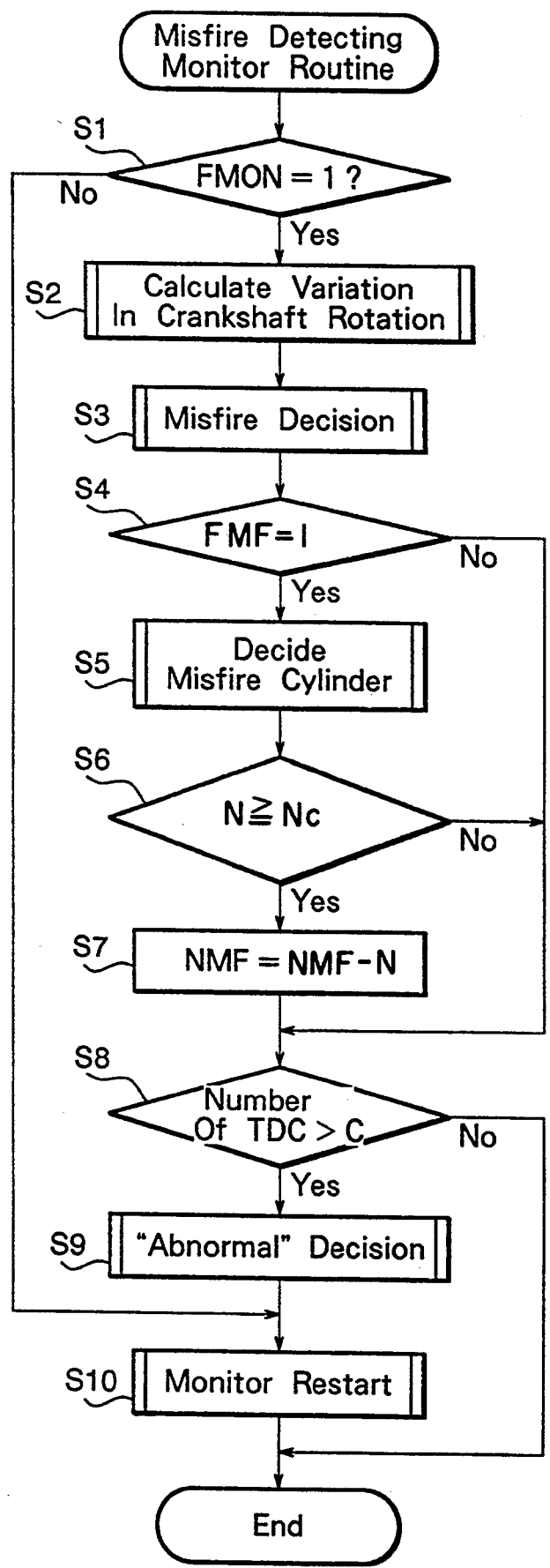
FIG. 2 is a flowchart of a misfire detecting monitor routine in the embodiment of the invention.

FIG. 2 is a flowchart showing the entire construction of a misfire detecting monitor routine. This routine is executed in synchronism with the occurrence of a TDC decision signal corresponding to each engine stroke (180° rotation by crankshaft).

Figure 3:
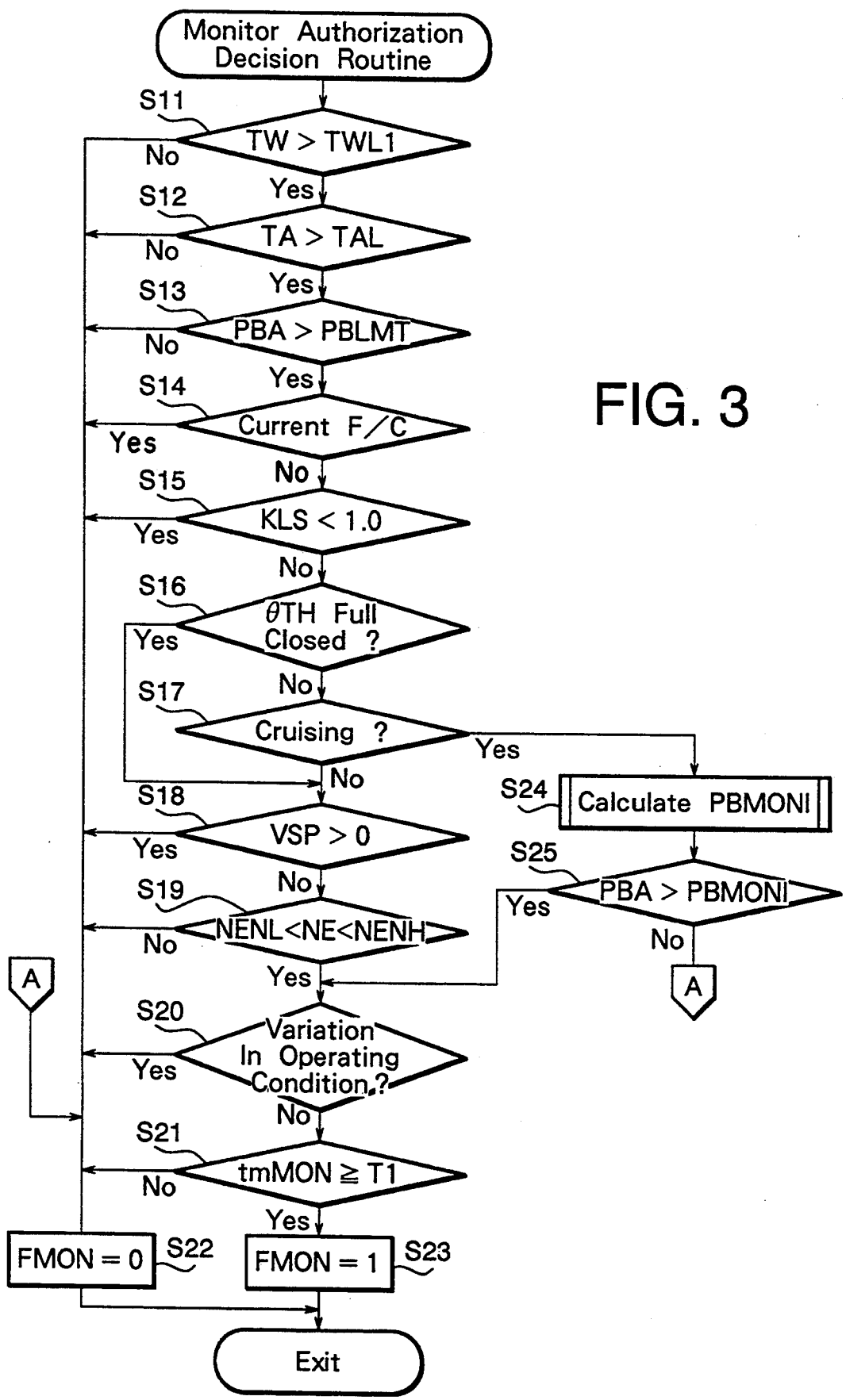
FIG. 3 is flowchart showing a monitor authorization decision routine.

First, judgment is made to see if Monitor Authorization Decision Flag FMON is set at "1" or not, and if the answer is negative, the flow jumps to step S10 to start a monitor authorization decision routine, which routine is shown in FIG. 3 and will be described later.

On the other hand, if the answer is affirmative in step S1, the flow advances to step S2 to measure a variation in the rotation of the crankshaft.

More specifically, a revolution time TREV(n) for 210° crankshaft is determined in accordance with the CRK signal pulse, and deviation $\Delta TREV(n)$ from a crankshaft revolution time TPEV(n-1) in the loop of the last time is calculated.

Then, the deviation $\Delta TREV(n)$ is compared with an average of three preceding deviations $\Delta TREV(n-1)$, $\Delta TREV(n-2)$, $\Delta TREV(n-3)$, and difference thereof is calculated as a revolution variation $\Delta\Delta TREV(n)$.

The above are measuring operations for a variation in the rotation of the crankshaft in step S2. Then, the flow advances to step S3 to make a misfire decision.

In the misfire decision step, first, a misfire decision map is selected according to the type of the transmission 17 and the state of the clutch, and a misfire decision value MFDEL is calculated.

The misfire decision map permits retrieval of the misfire decision value MFDEL from the engine rotational speed NE and the intake pipe internal absolute pressure PBA. The misfire decision value MFDEL is retrieved on the basis of the selected misfire decision map.

When the revolution variation $\Delta\Delta TREV(n)$ is larger than the misfire decision value MFDEL, it is judged that misfire is occurring, and flag FMF is set to "1". Conversely, when it is smaller, the flag FMF is set to "0".

When the misfire decision is over in this way, judgment is made in the next step S4 to see if the flag FMF is "1" or not. If it is "0", the flow jumps to step S8, while if it is "1", the flow advances to the next step S5 to decide which cylinder is misfiring.

The misfire cylinder is based upon how many times the TDC decision signal has been generated after the generation of CYL signal pulse and before detection of the misfire.

After decision of the misfire cylinder, the flow advances to step S6 to decide whether the misfire has occurred continuously by a predetermined number of times Nc or more. In the case of a four-cylinder engine, the predetermined number of time Nc is four.

Thus, in the case of a continuous misfires, a misfire cylinder is decided at every generation of TDC decision signal according to a misfire cylinder decision routine and so the number of times N of the continuous misfires is counted.

When the number of times of countinuous misfires N is smaller than a Nc times, the flow jumps to step S8, while when it is Nc times or more, the flow advances to step S7, in which a value obtained by subtracting the number of times N of continuous misfires from the number of times NMF of detected misfires is assumed to be the number of times NMF of misfires, and the number of times N of continuous misfires is not regarded as misfires. Then, the flow advances to step S8.

In step S8, a decision is made as to whether the number of TDCs has exceeded a predetermined number of times C (e.g. 1,000 times) after restart of the monitor, and if the answer is negative, this routine is ended, while if the answer is affirmative, the flow advances to step S9 to make an "abnormal" decision.

More specifically, in step S9, first, a decision is made to see if a variation in the revolution of the crankshaft has been detected without occurrence of any variation in the operating condition, e.g. acceleration, within a predetermined number of revolutions after restart of the monitor. If the answer is negative, the misfire detecting processing is ended, and only when the answer is affirmative, a misfire rate Φ is calculated. It is judged that a misfire rate value not smaller than a predetermined value $Φ_0$ indicates an abnormal condition, while a value thereof smaller than the predetermined value indicates a normal condition.

The misfire rate Φ is calculated by detecting the number of times of misfire, namely, the number of misfire TDCs, for a predetermined number of revolutions.

After the "abnormal" decision, the monitor authorization decision routine is restarted (step S10) and this program is ended.

The monitor authorization decision routine in the above misfire detecting monitor routine will be described below with reference to the flowchart of FIG. 3.

First, a decision is made as to whether the engine coolant temperature TW is not lower than a predetermined temperature TWL1 (e.g. 0° C.) (step S11), and if the answer is affirmative, a decision is made as to whether the intake air temperature TA is not lower than a predetermined temperature TAL (e.g. 0° C.).

When the answer in at least one of the steps S11 and S12 is negative, it is presumed that engine is off or warm-up has not been completed just after start-up of the engine. In this case, the flow jumps to step S22, in which flag FMON indicating monitor disapproval is set to "0" and this routine is ended.

On the other hand, when the answer in steps S11 and S12 is affirmative, the flow advances to step S13, in which judgment is made to see if the intake pipe internal absolute pressure PBA is not lower than limit value PBLMT (e.g. 105 mmHg).

When PBA is smaller than the limit value PBLMT, that is, when the answer is negative, the flow jumps to step S22 to disapprove monitor, while if the answer is affirmative, the flow advances to the next step S14, in which judgment is made to see if fuel-cut is made in the execution of this routine.

Whether fuel cut is being made or not is judged on the basis of the engine rotational speed NE and the opening θTH of the throttle valve 3. If the answer is affirmative, that is, if fuel-cut is being made, the flow jumps to step S22, in which flag FMON is set to "0" to disapprove monitor.

On the other hand, when the answer in step S14 is negative, the flow advances to step S15, in which judgment is made as to whether the fuel thinning correction coefficient KLS is not larger than "1.0" and if the answer is affirmative, that is, if KLS is smaller than 1.0, it is judged that the so-called rotation roughness is large and improper combustion is apt to occur, so in order to prevent and erroneous detection of misfire, the flow jumps to step 22, in which the flag FMON is set to "0" to disapprove the monitor of misfire.

On the other hand, when the answer in step S15 is negative, the flow advances to step S16, in which it is judged whether the opening θTH of the throttle valve 3 is in a fully closed condition or not. If the answer is negative, judgment is made in the next step S17 as to whether the vehicle is cruising or not, while if the answer is affirmative, the flow jumps over step S17 and advances to step S18.

The judgment whether the vehicle is cruising or not in step S17 can be made on the basis of whether the vehicle is in a running condition in which a variation in vehicle speed within, say, 0.8 km/sec continues for 2 seconds.

If the answer in step S17 is affirmative, that is, if the vehicle is cruising, the flow shifts to step S24, in which there is performed a low-load state judging processing according to the present invention. This step will be described below.

On the other hand, if the answer in step S17 is negative, that is, if the vehicle is not cruising, the flow advances to step S18, in which it is judged whether the vehicle speed VSP is larger than "0" or not. If the answer is affirmative, it follows that the vehicle is accelerating or decelerating, so the flow jumps to step S22, in which the flag FMON is set to "0" to disapprove monitor. On the other hand, if the answer in step S18 is negative, it follows that the engine is in a no load state, so the step advances to step S19, in which it is judged whether the engine rotational speed NE is within a predetermined range, that is, whether it is between NENL (say, 750 rpm) and NENH (say, 3,000 rpm). When the answer is negative, the flow jumps to step S22, in which the flag FMON is set to "0" to disapprove monitor, while when the answer is step S19 is affirmative, the flow advances to step S20 to judge whether there is a variation in the operating state.

In connection with whether a variation in the operating condition is present or not, judgement is made relating to an opening difference $ΔθTH$ in the valve opening θTH of the throttle valve 3, a pressure difference ΔPBA in the intake pipe internal absolute pressure PBA, a variation or non-variation in the pressure PBA in the load of the electric devices 21, and on-off of the various switches 20, and if in any one of them there is a variation, it follows that the answer in step S20 is affirmative, so the flow jumps to step S22, in which the flag FMON is set to "0" to disapprove monitor.

On the other hand, when the answer in step S20 is negative, the flow advances to step S21, in which it is judged whether a preset time T1 of a timer tmMON has elapsed or not.

That is, even if the answer in step S20 is negative and all of the conditions for monitor OK are satisfied, the flow advances to step S23 after the lapse of the preset time T1, in which the flag FMON is set to "1" to approve monitor, but before the lapse of the preset time T1, it is judged that there is a fear of variation in the operating condition, and the flow advances to step S22, in which the flag FMON is set to "0" to disapprove the monitor.

In such monitor authorization decision routine, when the answer of the judgment as to whether the vehicle is cruising or not in step S17 is affirmative, the flow advances to step S24, in which there is calculated a decision value PBMONI of the intake pipe internal absolute pressure to decide a monitor inhibition area in a low load condition.

Figure 4:
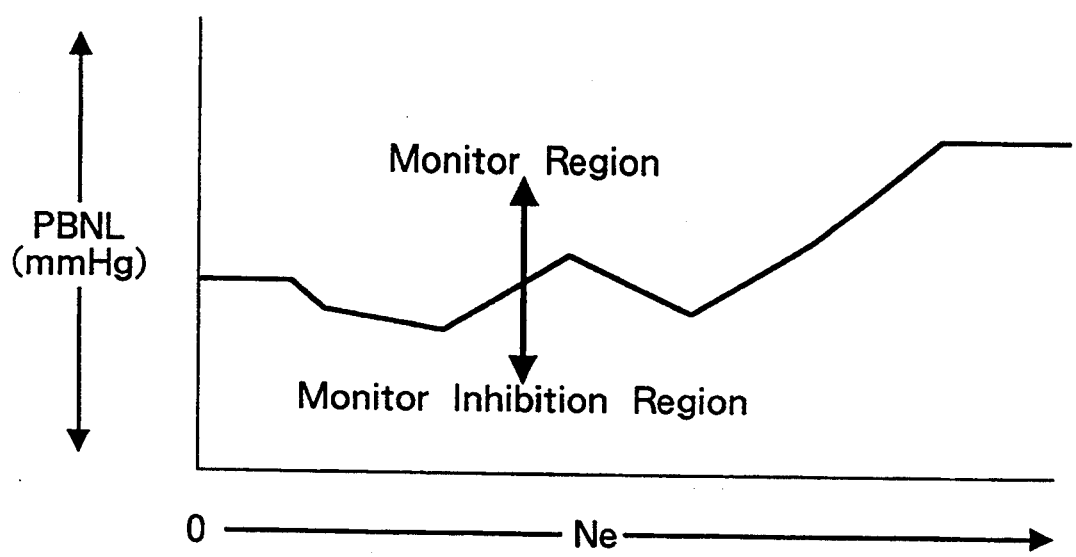
FIG. 4 is a diagram showing a PBNL table.

In calculating the decision value PBMONI, a no-load absolute pressure PBNL is determined by retrieving a PBNL table shown in FIG. 4 in which a low load region causing an erroneous detection of the misfire detecting system is preset in accordance with the engine rotational speed NE.

In the no-load absolute pressure PBNL, a variation thereof of about 10 mmHg has been subtracted in consideration of a secular change of the engine and a change in the no-load PBA caused by variations in the mass production of engine.

To cope with changes in the no-load PBA induced by changes in the atmospheric pressure, correction is made according to the following equation using an atmospheric pressure PALOW at the time of setting of the PBNL table and an atmospheric pressure PA at the time of monitor, to calculate a decision value PBMONI:

$$PBMONI = PBNL \times (PA/PALOW)$$

In step S25, a comparison is made with the actual intake pipe internal absolute pressure PBA on the basis of the decision value PBMONI after the above atmospheric pressure correction, and when the PBA exceeds the decision value PBMONI, the flow advances to step S20 to judge whether there is a variation in the operating condition. On the other hand, when the PBA is not larger than decision value PBMONI, the flow jumps to step S22, in which the flag FMON is set to "0" to disapprove monitor.

Thus, in the low load region in which there is a fear of erroneous misfire detection, the misfire monitor is disapproved to prevent misdetection, whereby misfire caused by some trouble of the system can be detected more surely.

Since the decision value PBMONI has been subjected to the atmospheric pressure correction, it is also possible to cope with changes in the cruising load value caused by the difference in atmospheric pressure.

In a low-load cruising region, for example, in the case of driving on a downhill at a highland, it is required to inject fuel in a minimum amount capable of being controlled by the fuel injection valve or smaller, and actually there sometimes occurs a case where fuel is not supplied even after opening of the injection valve and the air fuel ratio becomes a lean-side ratio, thus causing improper combustion. In such a case, an erroneous detection can be prevented by disapproving misfire detecting monitor.

In this embodiment, in step S13, other than steps S24 and S25, a control is made to disapprove monitor in a low load region in which the intake pipe internal absolute pressure PBA is below the limit value PBLMT. The reason why the decision step S13 based on the limit value PBLMT is that it is intended to prevent the occurrence of misdetection caused by an extremely small decision value PBMONI in step S24 after the atmospheric pressure correction and the resulting execution of misfire monitor also in an ultra-low load region.

Therefore, the misfire monitor is inhibited at a load lower than the limit value PBLMT independently of the engine rotational speed NE.

Another method is to determine a minimum value of the decision value PBMONI in advance.

Although the above embodiment is applied to the method wherein misfire is detected on the basis of a variation in the rotation of the crankshaft, the misfire detecting method employable in the present invention is not limited thereto. Also applicable to the invention is a method wherein misfire is detected by detecting an ionic current which is generated during combustion in a combustion chamber.

According to the present invention, as set forth above, the detection of misfire is inhibited when the actual intake pipe internal pressure is smaller than an intake pipe internal pressure in a no-load state which has been preset on the assumption that there will occur misdetection. Consequently, it is possible to prevent the occurrence of erroneous detection and detect misfire caused by some trouble of the system more surely.

Since the preset intake pipe internal pressure in a no-load state is corrected on the basis of atmospheric pressure, it is also possible to cope with changes in the cruising load value caused by the difference in atmospheric pressure.

Since the misfire detection inhibiting means is not operated except during cruising, it is possible to prevent unnecessary inhibition of the misfire detection.

What is claimed is:

1. A misfire detecting system for an internal combustion engine having an intake passage and a crankshaft, comprising:
   pressure detection means provided at the intake passage for detecting an pressure in the intake passage;
   rotational speed detection means for detecting a rotational speed of the crankshaft;
   storage means for storing reference pressure values in the intake passage predetermined according to rotational speeds of the crankshaft when the engine is in no-load state;
   reading out means for reading out one of the reference pressure values from said storage means in response to the rotational speed detected by the rotational speed detection means; and
   inhibiting means for inhibiting the detection of misfire when the pressure detected by the pressure detection means is lower than the reference pressure value read out from the storage means.

2. A misfire detecting system for an internal combustion engine according to claim 1, further comprising:
   correction means for correcting the reference pressure value which is read out from the storage means in response to atmospheric pressure,
   said inhibiting means inhibiting the detection of misfire when the pressure detected by the pressure detection means is lower than the reference pressure value corrected by said correction means.

3. A misfire detecting system for an internal combustion engine according to claim 1, wherein said inhibiting means is operated while the engine is in cruising state.

4. A misfire detecting system for an internal combustion engine according to claim 2, wherein said inhibiting means is operated while the engine is in cruising state.

* * * * *